(No Model.)

T. H. HICKS.
ARMATURE FOR DYNAMO ELECTRIC MACHINES OR ELECTRIC MOTORS.

No. 518,756.  Patented Apr. 24, 1894.

Witnesses
John Schuman
John F. Miller

Inventor
Thomas H. Hicks

By Attorney
Newell S. Wright

THE NATIONAL LITHOGRAPHING COMPANY,
WASHINGTON, D. C.

UNITED STATES PATENT OFFICE.

THOMAS H. HICKS, OF DETROIT, MICHIGAN.

ARMATURE FOR DYNAMO-ELECTRIC MACHINES OR ELECTRIC MOTORS.

SPECIFICATION forming part of Letters Patent No. 518,756, dated April 24, 1894.

Application filed January 9, 1893. Serial No. 457,811. (No model.)

*To all whom it may concern:*

Be it known that I, THOMAS H. HICKS, a subject of the Queen of Great Britain, residing at Detroit, county of Wayne, State of Michigan, have invented a certain new and useful Improvement in Electrical Armatures and the Connections of a Commutator Therewith; and I declare the following to be a full, clear, and exact description of the invention, such as will enable others skilled in the art to which it appertains to make and use the same, reference being had to the accompanying drawings, which form a part of this specification.

This invention relates to new and useful improvements in the construction of armatures, for dynamo electric machines, and electric motors, of either continuous or alternating current types, the only necessary change for different types being in the plan of connecting the armature coils with each other and with the collector; which may be done in any suitable manner agreeing with the type of machine constructed, as will be readily understood by those skilled in the art.

The following is a full, clear and exact description of my invention; reference being had to the accompanying sheet of drawings, in which—

Figure 1:
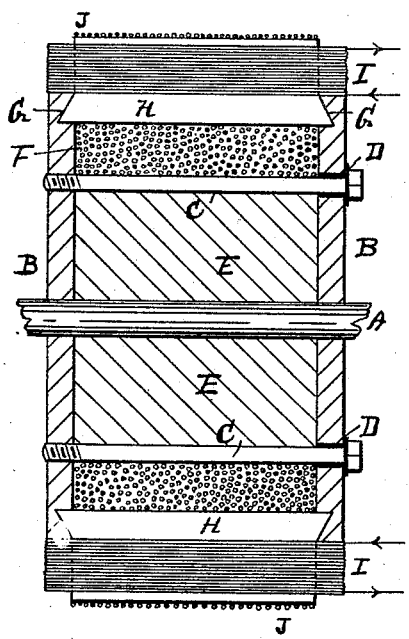
Figure 3:
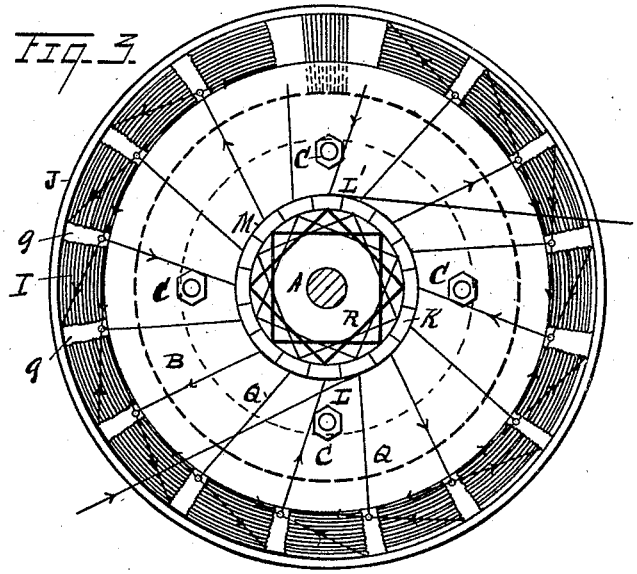
Figure 2:
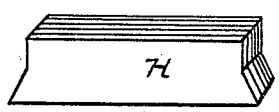
Figure 4:
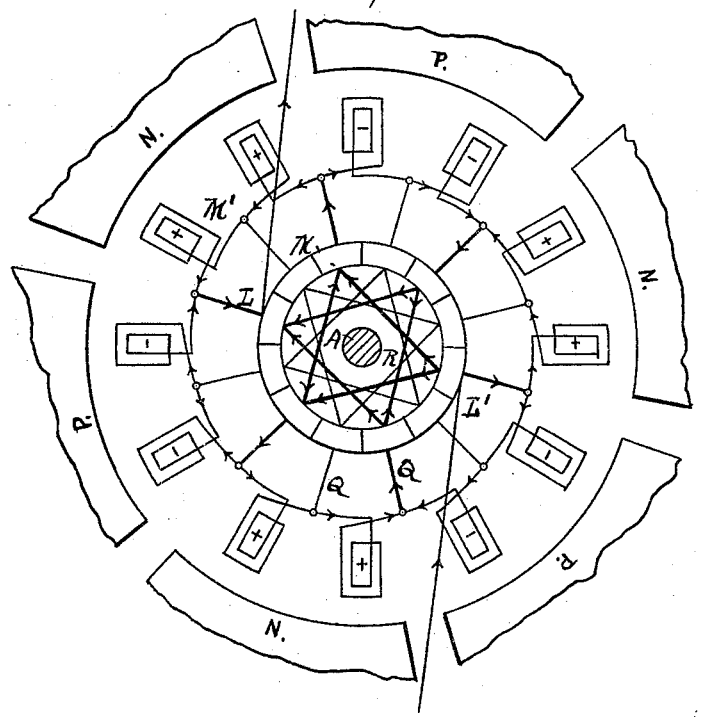

Figure 1 is a horizontal section, showing the internal construction of the armature and one side of two armature bobbins arranged diametrically opposite one another. Fig. 2 is a perspective view of a laminated iron core used in each of the armature bobbins referred to in Fig. 1. Fig. 3 is an end view of a complete armature having sixteen armature bobbins, connected to an equal number of commutator segments, and showing in dotted lines, an iron wire cylinder which forms a part of the magnetic circuit of the laminated iron cores of the bobbins, one iron core being left unwound. Fig. 4 is also an end view of Fig. 1, showing in diagram the manner of connecting the armature bobbins with each other and with the commutator segments for collecting currents having only one direction. This figure also shows six inducing magnets partly cut away, and the commutator segments joined together in sets, by cross connections, appropriate for a continuous current mutipolar machine having six field of force magnets and using only two collecting brushes. Fig. 3 shows a similar manner of connecting the commutator segments in a multi-polar machine having eight inducing magnets with one pair of collecting brushes. But when I use this armature in a bi-polar machine I then dispense with the commutator cross connections, shown in Figs. 3 and 4.

Turning more especially, first, to Fig. 1, A is the shaft upon which the armature is constructed. B B are two circular flanges or heads forming the ends of the armature. These I prefer to shrink tightly upon the shaft A, after which they are turned off in a lathe, so as to be balanced during rotation. Equidistant from the shaft, and parallel therewith, are supporting bolts C, which serve to keep the flanges or heads B from spreading apart and at the same time form a non-shrinkable support for the iron wire cylinder F. Each bolt is insulated at one end where it passes through the flanges or head. The insulation is marked D. After the bolts are secured in place, they are turned off in a lathe on the outer portion between the flanges. Between the flanges and radially from the shaft, as far as the outer surface of the bolts, the armature is filled with any good non-conducting material, such as cement, plaster of paris or wood secured to the ends of the flanges. I prefer plaster of paris. After the filling is in place, the portion of the armature so far completed is put in a lathe and the non-conducting material turned off until the outer surface of the bolts is reached. This non-conducting material is marked E. Upon the bolts C and non-conducting material E, I next wind iron wire, so as to form a magnetizable cylinder F. The bolts form a permanent support for the cylinder in case shrinkage should occur in the non-conducting material after use. The non-conducting material is used only to form a foundation upon which to wind the wire F. Upon the inner surface of each flange B, at or near the periphery, I turn an annular groove, marked G. I prefer to construct the groove in the form of a dove-tail, as shown, although the shape of the groove is a matter of choice. I next arrange a number of laminated iron cores H equidistant from each other in the grooves G. These cores H may be placed in the grooves G in any proper manner, as by being sprung in place one or two at a time, or a slot may be cut from the outer portion of the groove to the inner, and the thin piece then slid through the slot into proper place. The laminæ of each core are coated with shellac, and when dried by heat they unite to form a solid core H, as shown in Fig. 2. The cores H may be securely held equidistant from each other by wood or other suitable material, placed in the groove G, between each core, as shown at "g." The number of cores H required in the construction of the armature, will be governed by the number of field magnets used in the machine. The number of cores used should be divisible by the number of field magnets without a remainder. The cores H are next wound lengthwise with insulated copper wire, as shown in Figs. 1, 3 and 4, and the ends of the bobbins are joined to each other, so as to form a symmetrical winding, having two paths for the current to travel, as shown in Figs. 3 and 4. The bobbins of copper wire are marked I, in Figs. 1, 3, and 4.

J in Figs. 1 and 3, represents a band of wire to assist in holding the cores H and bobbins of wire I in place.

The essential features of my present invention are: first, in forming a double support for the iron wire cylinder F; one being composed of a non-conducting substance, such as plaster of paris, and the other of a non-shrinkable substance, such as the iron bolts C; second, separate laminated iron cores H; the laminæ being arranged parallel to the shaft of the armature. In this way the cores may be cheaply made; there being little or no waste in cutting up a sheet of iron; third, the manner of securing and holding the cores H in place radially around the iron cylinder, by the annular groove G, which, together with the wire band J, unite to resist centrifugal force, the cylinder and cores thus uniting to form the armature magnetic circuit. I wish it to be understood that the wire band J does more than hold the copper wire in place, as in the case of other armatures; it assists very importantly in holding the iron cores H against centrifugal force. This is not the case with other armatures; therefore, the band J forms an important factor in my invention. Fourth, forming the magnetic circuit of the armature of separate pieces; such as the ring F and cores H. In this way, burned out coils are easily replaced; and not only that but the terminals of the bobbins being easily accessible, an armature can be changed to suit either a bi-polar or multi-polar continuous current machine, or, an alternating current machine, in a manner which will be readily understood by those skilled in the art. There are several other minor features which I embrace in my claims.

What I claim as my invention is—

1. In an electric machine, an armature consisting of a shaft, heads B B, non-conducting material E about the shaft, supports C, a wire cylinder F, and cores H, each wound with wire bobbins, substantially as described.

2. In an electric machine, an armature consisting of a shaft, heads B B secured to the shaft, non-conducting material about the shaft, and a wire cylinder F located about said non-conducting material, substantially as described.

3. In an electric machine, an armature consisting of a shaft, heads B B secured to said shaft, cores H non-conducting material E about the shaft, a wire cylinder F located about said non-conducting material, and coils I located parallel to the shaft, said heads constructed with annular grooves to hold the cores of said coils, substantially as described.

4. In an electric machine, an armature having laminated cores arranged parallel to and radially about the armature shaft, and a magnetizable cylinder, said cores being also arranged radially around said cylinder, substantially as described.

5. In an electric machine, an armature having a shaft A, flanges B, B secured to the shaft, provided with grooves G, and cores H, laminated in a direction parallel to the shaft and the ends of the cores being arranged in said grooves, substantially as described.

6. In an electric machine, an armature having a magnetizable cylinder F supported to rotate with the shaft by flanges B and non-conducting material E, substantially as described.

7. In an electric machine, a magnetizable cylinder F, an armature having laminated cores H arranged upon said cylinder, and a band J wound upon said cores, substantially as described.

8. In an electric machine the combination of an armature, and pairs of field magnets, the armature having cores laminated in a direction parallel to the shaft of the armature and wound with bobbins of wire I, the field magnets arranged alternately of opposite magnetic sign around said armature, substantially as described.

In testimony whereof I sign this specification in the presence of two witnesses.

THOMAS H. HICKS.

Witnesses:
N. S. WRIGHT,
JOHN F. MILLER.